Dec. 28, 1943.                A. F. WHITEHEAD                2,337,951
        TESTING DEVICE FOR USE IN THE APPLICATION OF SCREW CLOSURES
                        Filed March 11, 1941        2 Sheets-Sheet 1
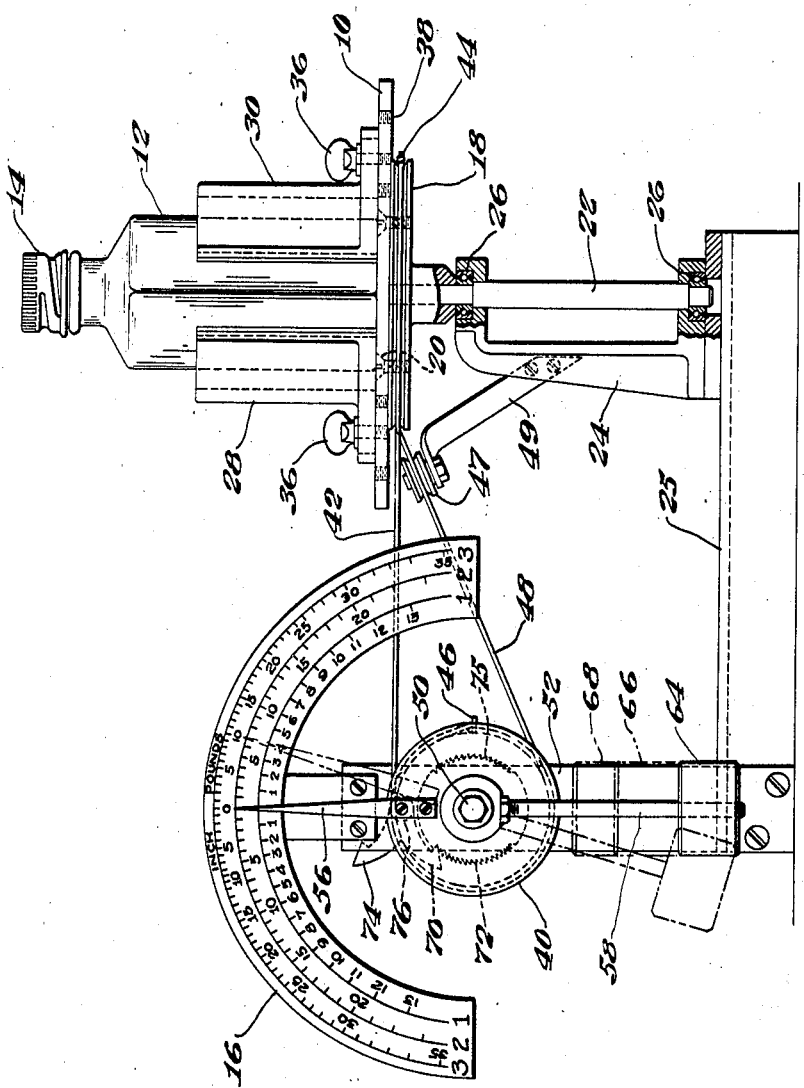
INVENTOR
Austin F. Whitehead
BY J. Stanley Churchill
ATTORNEY

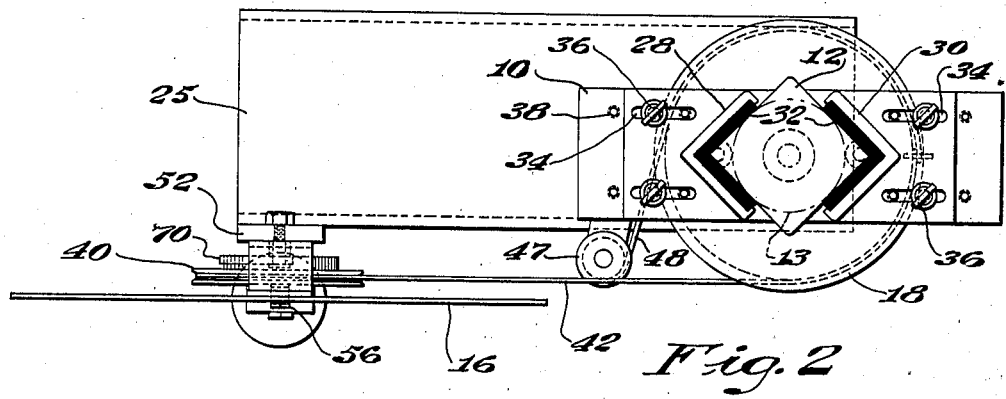
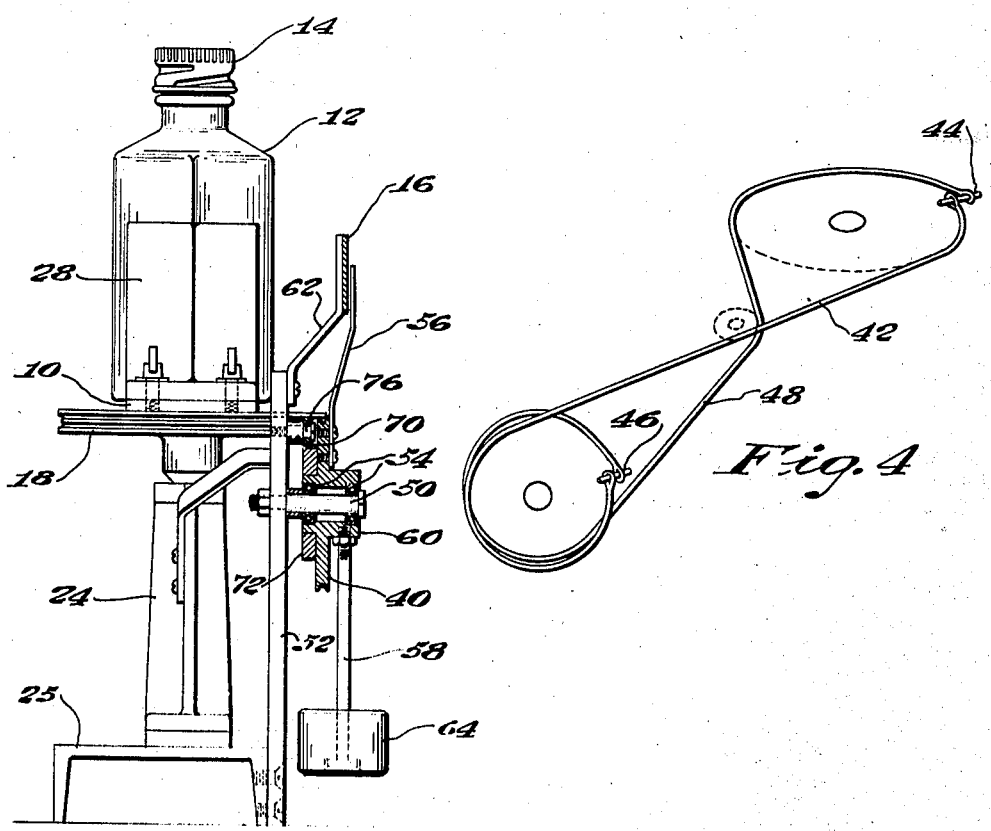

Patented Dec. 28, 1943

2,337,951

UNITED STATES PATENT OFFICE 2,337,951

TESTING DEVICE FOR USE IN THE APPLICATION OF SCREW CLOSURES

Arthur F. Whitehead, Wollaston, Mass., assignor to Pneumatic Scale Corporation, Limited, Quincy, Mass., a corporation of Massachusetts Application March 11, 1941, Serial No. 382,719

6 Claims. (Cl. 265—17)

This invention relates to a testing device for indicating the degree of tightness with which a screw closure is applied to a container.

One object of the invention is to provide a novel and improved testing device of the character described in which provision is made for measuring the torque being applied to a screw closure in its application to or the torque required, in its removal from a container.

Another and more specific object of the invention is to provide a novel and simple testing device for use upon containers to which closures have been applied by automatic machines for determining the force required to remove said closures from said containers.

With these objects in view and such others as may hereinafter appear, the invention consists in the testing device, and in the various structures, arrangements and combinations of parts hereinafter described and particularly defined in the claims at the end of this specification.

In the drawings, illustrating the preferred embodiment of the invention, Fig. 1 is a front elevation of testing apparatus embodying the present invention; Fig. 2 is a plan view of the apparatus shown in Fig. 1; Fig. 3 is an end view of the apparatus shown in Fig. 1, partly in cross-section; and Fig. 4 is a diagrammatic view to be referred to.

In general, the present invention aims to provide a novel and improved testing device for indicating the amount of force necessary to untwist a closure which has been applied to a container. The device is particularly useful in a bottling or packing plant where the closures are applied by automatic machinery. At such establishments the present device may be used to periodically test groups of closed containers in order that the machine may be adjusted to apply more or less twisting force to obtain the preferred degree of tightness between the closure and the container. Provision is made in the improved testing device for measuring the force required to remove either left hand or right hand threaded closures and, if desired, a closure may be applied to a container and the degree of tightness with which it is applied may be read directly during the application thereof.

In its preferred form, the present testing device is adapted to be operated by manual application of force for removing a closure from or applying a closure to a container in order to indicate the degree of tightness. The device, calibrated to read the torque applied in inch-pounds, is simple in construction and accurate in operation.

Referring now to the drawings, the improved testing device illustrated therein comprises a platform 10 upon which a container 12 may be supported during the removal or application of a closure 14, and a calibrated gauge 16 upon which the torque utilized in the application or removal of the closure may be read in inch-pounds. The platform 10 is secured to a disk or pulley 18 by screws 20 and the pulley is fixed to the upper end of a vertical shaft 22. The vertical shaft 22 is rotatably mounted in a bracket 24 supported upon the base 25 of the device. The shaft 22 is provided with anti-friction bearings 26 in the bracket 24. Provision is made for clamping a container upon the platform 10 and as herein shown, clamping members 28, 30, preferably faced with rubber inserts 32, are adjustably secured to the platform. The clamping members are preferably V-shaped, see Fig. 2, in order that they may be adapted to hold either a rectangular container 12 as shown by full lines, or a round container 13 as shown by dotted lines. Adjustment of the clamping members may be effected by movement toward or from the center of the platform, as permitted by the slots 34, and the clamping members may be secured in clamping position by tightening the thumb screws 36. Additional threaded holes 38 are provided in the platform for the thumb screws 36 in order to permit additional range of adjustment.

The twisting moment or force applied to the closure 14 is transmitted from the pulley 18 to a second pulley or disk 40 by a flexible cord or wire 42, one end of which is secured to a pin 44 fast in the pulley 18 and the other end of which is secured to a pin 46 fast in the pulley 40. The manner in which the wire 42 is looped about the pulleys is diagrammatically illustrated in Fig. 4, and as shown therein, a second wire 48 also connected to the pins 44, 46 is looped in the opposite direction from the wire 42. In the operation of the device, when the pulley 18 is turned counterclockwise, the wire 42 will turn the pulley 40 clockwise, and conversely when the pulley 18 is turned clockwise, the wire 48 will turn the pulley 40 counterclockwise. Thus, when one wire is active, the other is inactive, depending upon the direction of rotation of the force applied to the closure 14. It will be seen, however, that the inactive wire becomes active to return the device to its normal position, as will be hereinafter described. Since one pulley is mounted with its axis in a vertical plane and the other with its axis in a horizontal plane, an idler pulley 47 supported from the bracket 24 by a strap 49 is provided to guide the wire 48 from one pulley to the other.

The second pulley is weighted, as will be described, to counteract or counterbalance the torque applied to the pulley 40, and as herein shown, the pulley 40 is rotatably mounted upon a stud 50 which is secured to a standard 52 mounted on the base 25. This pulley is likewise provided with anti-friction bearings 54. A pointer or indicator 56 is secured to the pulley 40 and is arranged to normally extend in a vertical plane by a weighed rod 58 secured to the underside of the hub 60 of the pulley 40. In its normal or vertical position, the pointer registers with zero on the gauge 16. As herein shown, the gauge 16 is supported from the standard 52 by a strap 62.

The graduations upon the gauge 16 are symmetrically arranged on either side of the zero, the pointer moving to the right when the force applied to the closure 14 is counterclockwise, and moving to the left when the force applied to the closure 14 is clockwise. The gauge is divided into three different scales or series of graduations and as herein shown, the scales are numbered 1, 2 and 3. Three different weights, 64, 66, 68 are provided for the rod 58. In the operation of the device, when only one weight 64 is hung on the rod, scale No. 1 is read, when the weight 66 is added, scale No. 2 is read and when weight 68 is added, scale No. 3 is read.

The graduations upon each scale are calibrated to be read with the different weights in position on the rod 58 and the different scales are provided to take care of different ranges of twisting forces, i. e., scale No. 1 is graduated from 1 to 13 inch-pounds, scale No. 2 is graduated up to 20 inch-pounds, and scale No. 3 is graduated up to 35 inch-pounds. Although any twisting force from 1 to 35 pounds may be read upon the outer scale, No. 3, provided all the weights are in position on the rod, yet, for practical purposes, scales No. 1 and No. 2 are provided to be used in conjunction with their respective weights in order that the forces within their range may be read more easily because of the greater distance between graduations.

From the description thus far, it will be seen that in the operation of the device, a twisting moment applied to the closure 14 is counteracted by the weighted rod 58 and in effect the latter acts as a counterbalance. It will be apparent that as the rod 58 with its weight is rocked from its vertical position, the center of gravity of the weight with relation to its pivot point 50, is changed and the resistance or counteraction to the turning force increases the farther it is rocked from its vertical position. The ratio between the pulleys 18, 40 and the counteracting effect of the weights, are so proportioned in the device, that any twisting force applied to the closure 14 will be indicated by the pointer 56 on the calibrated gauge 16.

For example, assuming that the weight 64 is in position on the weighted rod so that the twisting force is to be read on scale No. 1 and the closure 14, provided with a right hand thread, is to be removed in order to determine the degree of tightness with which it was applied. A counterclockwise twist applied to the closure will transmit a clockwise rotary movement to the pulley 40 through the wire 42. This rotary movement is counteracted by the weight 64 and the farther the weight is rocked away from its vertical or resting position, the greater will be the resistance to the twisting force applied to the closure. When a twisting force sufficient to effect release of the closure from the container is reached, the maximum position of the pointer 56 on the calibrated gauge 16 indicates the number of inch-pounds of force employed to loosen the closure.

In the above example, the wire 42 was active and the wire 48 was inactive, simply following along with the rotary movement of the pulleys 18, 40. However, when the closure is released from the container, the weight 64 swings back to its resting position and in so doing, the wire 48 becomes active to return the pulley 18 to its normal or starting position and the wire 42 becomes inactive. From the above description it will be apparent that a reversal in the direction of the torque applied to the closure 14 will reverse the direction of rotation of the pulley 40 and the pointer will indicate the inch-pounds on the opposite side of the calibrated gauge.

Provision is made for holding the pointer 56 in its registered position when the closure releases from the container and to this end a pawl 70 is arranged to engage the teeth of a ratchet 72 mounted upon and secured to a hub extending from the pulley 40. The pawl 70 is integral with a second pawl 74 which is arranged to engage the teeth 75 upon the other side of the ratchet. As illustrated in Fig. 1, the ratchet teeth are cut in opposite directions through 90 degrees upon either side of the periphery of the ratchet and the double pawl may be swung about its pivot 76 to engage either side depending upon which direction the pointer is to swing. In operation, after a test is completed and the reading on the gauge noted, the pawl is manually raised from its operative position to permit the device to return to its initial position.

From the above description it will be seen that the present device may be used for measuring the twisting force used for loosening a previously applied closure from a container and also that the device may be used for measuring the torque applied in either direction so that right hand or left hand closures may be tested. It is also apparent that a closure may be applied to the container while positioned in the device and that such closure may be applied with a predetermined degree of tightness as registered directly upon the gauge 16.

Although the invention has been herein illustrated and described as embodied in a device for measuring and reading the force applied in inch-pounds, and the parts are proportioned and counterweighted with relation to the gauge to effect such reading, it will be apparent that the parts may be otherwise proportioned and that other gauges provided with suitable graduations may be employed to test the relative amount of force required to remove or apply closures from or to different containers.

The present invention is particularly useful for testing the performance of an automatic closure applying machine whereby the packer may periodically test the output of the machine and avoid sending out containers abnormally tight or abnormally loose by adjusting the machine to suit as indicated by the testing device.

While the preferred embodiment of the invention has been herein illustrated and described, it will be understood that the invention may be embodied in other forms within the scope of the following claims.

Having thus described the invention, what is claimed is:

1. A testing device for indicating the relative force exerted in the removal or application of a screw closure from or to a container comprising a horizontally mounted rotary member provided with container clamping means for supporting a container in an upright position and arranged to rotate therewith about a vertical axis when a twisting force is exerted to remove or apply said closure, a member mounted to rock in a vertical plane and provided with counterbalancing means operatively connected to said rotary support and movable in predetermined increments in accordance with the force exerted, and a gauge calibrated in accordance with the movement of said counterbalancing means whereby the force exerted in removing or applying said closure may be determined.

2. A testing device for indicating the relative force exerted in the removal of a screw closure from a container comprising a horizontally mounted rotatable support for the container arranged to rotate therewith about a vertical axis when a twisting force is exerted to remove said closure, a member mounted to rock in a vertical plane and provided with counterbalancing means, a flexible connection between said support and said counterbalancing means, said counterbalancing means being movable in predetermined increments in accordance with the force exerted, and a graduated scale for measuring the movement of said counterbalancing means.

3. A testing device of the character described, comprising container holding means including a horizontally mounted support rotatable about a vertical axis with the container when a twisting force is applied thereto, means including a counterweight mounted to rock in a vertical plane and operatively connected to said container holding means and movable therewith for counterbalancing the force applied to said container, and means for measuring the movement of the counterweight whereby the relative force applied to said container may be determined, said counterweight being mounted so as to increase its effective counterbalancing effect in accordance with the increase in force applied to said container.

4. A testing device of the character described, comprising container holding means including a horizontally mounted platform rotatable about a vertical axis with the container when a twisting force is applied to remove a closure from the container, counterbalancing means including a rotary member mounted to rotate in a vertical plane, a flexible connection between said platform and said rotary member, a weighted rod suspended from said rotary member arranged to be rocked from its vertical line of suspension when a twisting force is applied to said container, the effective counterbalancing force of said weighted rod being increased as the force applied thereto is increased, a gauge calibrated in accordance with the movement of said weighted rod, and a pointer carried by said rotary member cooperating with said gauge whereby the force exerted to effect release of said closure from its container may be measured.

5. A testing device of the character described, comprising container holding means including a horizontally mounted platform rotatable about a vertical axis with the container when a twisting force is applied to remove a closure from the container, counterbalancing means operatively connected to said holding means including a rotary member mounted to rotate in a vertical plane, a weighted rod suspended from said rotary member arranged to be rocked from its vertical line of suspension when a twisting force is applied to said container, the effective counterbalancing force of said weighted rod being increased as the force applied thereto is increased, a gauge calibrated in accordance with the movement of said weighted rod, and a pointer carried by said rotary member cooperating with said gauge whereby the force exerted to effect release of said closure from its container may be measured, and means for retaining said pointer in the maximum position to which it is moved.

6. A testing device for indicating the relative force exerted in the removal or application of a screw closure from or to a container comprising container holding means including a horizontally mounted platform rotatable about a vertical axis with the container when a twisting force is exerted to remove or apply said closure, counterbalancing means operatively connected to said holding means including a suspended weight arranged to be rocked from its vertical line of suspension when a twisting force is applied to said container in either direction, the effective counterbalancing force of said suspended weight being increased as the force applied thereto is increased, a gauge calibrated in accordance with the movement of said weight, a pointer connected to said weight and cooperating with said gauge whereby the force exerted in removing or applying said closure may be measured, and means for retaining said pointer in the maximum position to which it is moved.

ARTHUR F. WHITEHEAD.